US008811325B2

(12) United States Patent
Tang

(10) Patent No.: US 8,811,325 B2
(45) Date of Patent: Aug. 19, 2014

(54) NETWORK SIDE DEVICE AND METHOD FOR TRANSMITTING CONFIGURATION INFORMATION OF PATHLOSS POWER THRESHOLD THEREOF

(75) Inventor: Lin Tang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 9 days.

(21) Appl. No.: 13/577,783

(22) PCT Filed: Apr. 27, 2011

(86) PCT No.: PCT/CN2011/073407
§ 371 (c)(1),
(2), (4) Date: Aug. 8, 2012

(87) PCT Pub. No.: WO2011/150728
PCT Pub. Date: Dec. 8, 2011

(65) Prior Publication Data
US 2013/0070696 A1    Mar. 21, 2013

(30) Foreign Application Priority Data

Jun. 1, 2010  (CN) .......................... 2010 1 0191665

(51) Int. Cl.
*H04W 72/04*    (2009.01)
*H04W 52/36*    (2009.01)
*H04W 52/16*    (2009.01)
*H04W 52/50*    (2009.01)
*H04W 52/24*    (2009.01)
*H04W 52/32*    (2009.01)
*H04W 52/14*    (2009.01)
*H04W 74/08*    (2009.01)

(52) U.S. Cl.
CPC ............ *H04W 72/04* (2013.01); *H04W 52/362* (2013.01); *H04W 52/16* (2013.01); *H04W 52/50* (2013.01); *H04W 52/247* (2013.01); *H04W 52/325* (2013.01); *H04W 52/146* (2013.01); *H04W 74/0833* (2013.01)
USPC ....................................................... 370/329

(58) Field of Classification Search
USPC .......... 370/311, 329, 342, 474, 335; 455/522, 455/450, 453, 436
See application file for complete search history.

(56) References Cited

FOREIGN PATENT DOCUMENTS

CN       101426271 A      5/2009
WO    2009135848 A2    11/2009

OTHER PUBLICATIONS

"Resource Allocation for SC-FDMA in LTE Uplink", Wang, Miao et al, IEEE 2011, 978-1-4577-0574-8/11, pp. 601-604.*

(Continued)

*Primary Examiner* — Charles C Jiang
*Assistant Examiner* — Rose Clark
(74) *Attorney, Agent, or Firm* — Ling Wu; Stephen Yang; Ling and Yang Intellectual Property

(57) ABSTRACT

The present invention discloses a method for transmitting path loss power threshold configuration information and a network side device. The method includes: the network side increasing or reducing the weighted sum value currently selected by the cell according to the scenario of resources which can be allocated in a current cell, updating the random access preamble group B power offset value and the power offset value between the random access preamble and the first scheduled transmission (Msg3) sent over the uplink channel resources respectively according to the increased or reduced weighted sum value, sending the updated random access preamble group B power offset value and the updated power offset value between the random access preamble and Msg3 to a terminal of the cell.

19 Claims, 3 Drawing Sheets

(56) References Cited

OTHER PUBLICATIONS

"Uplink Resource Allocation Algorithms for Single-Carrier FDMA Systems", Sokmen, Fatma et al, 2010 European Wireless Conference, IEEE 978-1-4244-6001-4/10, pp. 339-345.*

"Optimal Resource Allocation in Uplink SC-FDMA Systems", Wong, Ian et al, IEEE Transactiona on Wireless Communications, vol. 8, No. 5, May 2009, pp. 2161-2164.*

"An Overview of Resource Allocation Algorithms for OFDM Systems", Jiang, Lai-wei et al, 2012 Second International Conference on Instrumentation and Measurement, Computer, Communication and Control, IEEE 978-0-7695-4935-4/12, pp. 429-432.*

"Uplink Resource Allocation for Frequency Selective Channels and Fractional Power Control in LTE", Madan, Ritesh et al, 978-1-61284-233-2/11, IEEE 2011, pp. 1-5.*

3GPP TS 36.321 V9.2.0: Evolved Universal Terrestrial Radio Access (E-UTRA); Medium Access Control (MAC) protocol specification Apr. 21, 2010 Section 5.1.

3GPP TS 36.213 V9.1.0: Evolved Universal Terrestrial Radio Access (E-UTRA); Physical layer procedures Mar. 21, 2010 Section 5.1.1.

International Search Report for PCT/CN2011/073407 dated Jun. 21, 2011.

* cited by examiner

```
┌─────────────────────────────────────────────────────┐
│ The network side sets Msg3 size threshold according │──── 300
│ to the Msg3 size of the random access initiated     │
│ for different reasons                               │
└─────────────────────────────────────────────────────┘
                         │
                         ▼
┌─────────────────────────────────────────────────────┐
│ The network side sets the maximum transmitting      │
│ power of the UE and the preamble initial target     │──── 301
│ reception power in the path loss power              │
│ threshold configuration information                 │
└─────────────────────────────────────────────────────┘
                         │
                         ▼
┌─────────────────────────────────────────────────────┐
│ The network side determines the corresponding       │
│ relation between the group B power offset           │──── 302
│ (messagePowerOffsetGroupB) and $N_{RB\_B}$, $I_{MCS}$ │
└─────────────────────────────────────────────────────┘
                         │
                         ▼
┌─────────────────────────────────────────────────────┐
│ The network side determines the corresponding       │
│ relation between the power offset between the       │──── 303
│ random access preamble and Msg3                     │
│ (deltaPreambleMsg3) and $I_{MCS}$                   │
└─────────────────────────────────────────────────────┘
                         │
                         ▼
┌─────────────────────────────────────────────────────┐
│ The network side determines the corresponding       │
│ relation between the weighted sum $R_{all}(k)$ of   │
│ $R_{messagePowerOffsetGroupB}(m)$ of group B        │──── 304
│ power offset (messagePowerOffsetGroupB) and         │
│ $R_{deltaPreambleMsg3}(n)$ of the power offset      │
│ between the random access preamble and Msg3         │
│ (deltaPreambleMsg3) and $N_{RB\_B}$, $I_{MCS}$      │
└─────────────────────────────────────────────────────┘
                         │
                         ▼
┌─────────────────────────────────────────────────────┐
│ The network side determines the scenario of         │
│ resources which can be allocated in a current cell  │──── 305
│ and selects the corresponding $R_{all}(k)$          │
│ according to the determined scenario                │
└─────────────────────────────────────────────────────┘
                         │
                         ▼
┌─────────────────────────────────────────────────────┐
│ $R_{deltaPreambleMsg3}(n)$ and                      │
│ $R_{messagePowerOffsetGroupB}(m)$ corresponding to  │
│ the selected $R_{all}(k)$ are determined, and the   │
│ path loss power threshold information               │──── 306
│ including the maximum transmitting power of the UE, │
│ the preamble initial target reception power,        │
│ $R_{deltaPreambleMsg3}(n)$ and                      │
│ $R_{messagePowerOffsetGroupB}(m)$ is sent to the UE │
│ by way of a system message                          │
└─────────────────────────────────────────────────────┘
                         │
                         ▼
┌─────────────────────────────────────────────────────┐
│ The UE determines and configures the path loss      │
│ power threshold (RACH_MSG3_THRESHOLD) according     │──── 307
│ to the received system message                      │
└─────────────────────────────────────────────────────┘
```

FIG. 3

NETWORK SIDE DEVICE AND METHOD FOR TRANSMITTING CONFIGURATION INFORMATION OF PATHLOSS POWER THRESHOLD THEREOF

TECHNICAL FIELD

The present invention relates to the field of mobile communication systems, and particularly, to a network side device and a method for transmitting path loss power threshold configuration information thereof in the 3rd Generation Partnership Project (3GPP) Long Term Evolution (LTE) mobile communication system.

BACKGROUND OF THE RELATED ART

The main function of the random access of the LTE system is to acquire uplink synchronization and to allocate one cell unique identifier "Cell Radio Network Temporary Identifier (C-RNTI)" to the user equipment (UE) when establishing an initial network access, for example, transiting from the Radio Resource Control (RRC)_idle (IDLE) state to RRC_connected (CONNECTED) state. The random access process of the LTE system has the following two manners:

the first is non-contention based access manner. As to the non-contention based random access process, the eNodeB (eNB) can avoid contention by allocating one specific preamble sequence to the UE.

The second is contention based access manner. As to the contention based random access process, one preamble sequence randomly selected by the UE may cause a plurality of UEs to simultaneously select the same preamble sequence for transmission, resulting in collision, and then one contention resolution process is needed for performing processing, as shown in FIG. 1. First, the UE randomly selects one from the contention based random access preamble and initiates random access. After having received the preamble from the UE successfully, the eNB scuds one random access response to the UE, which includes the ID of the preamble. C-RNTI, information about uplink timing synchronization, and information about the radio resources allocated to the Msg3 and so on. In this case, the Msg3 is the first scheduled transmission (also referred to as Message 3, abbreviated as Msg3) sent over the uplink channel resource. Then, the UE sends the Msg3 to the eNB according to the radio resource information about the Msg3 in the received random access response, and the Msg3 includes a RRC message, UE ID, etc. At last, the eNB sends a random access contention resolution message Msg4 including UE ID, and the UE deems that the contention is resolved when the UE ID in the received Msg4 matches the UE ID sent in the Msg3.

According to the above random access manner, 64 preambles in one cell can be classified as two categories: contention based random access preamble and non-contention based random access preamble. However, the contention based random access preamble can also be divided into two groups: Group A and Group B, as shown in FIG. 2. At most times, the eNB has no idea about the reason for triggering random access nor about the cache state of the UE, therefore, after the random access preamble is received successfully, the eNB can only allocate one default standard resource configuration to the first transmission of the physical uplink shared channel (PUSCH), i.e. Msg3. However, the UE itself knows the reason for triggering random access and the size of the Msg3 and can measure the path loss of the radio channel, and according to two conditions of Msg3 size and Path loss, the UE can select a contention based random access preamble Group, wherein Group A corresponds to small Msg3 size and Group B corresponds to large Msg3 size. After having received the preamble sent by the UE successfully, the eNB can know the Msg3 size according to the Group where the preamble is located. Then, resources can be allocated to the Msg3 in the random access response according to the information of Msg3 size, thus the PUSCH resources of the Msg3 can be allocated with high efficiency.

Usually, 1 resource block is allocated to the Msg3 of Group AUE, and 2 RB resources are allocated to the Msg3 of Group BUE, however, it is not excluded here that more than 2 RD resources are allocated to the Msg3 of UE in the Group B according to different Msg3 sizes. However, such allocation of resources is not based on each subframe but allocated by the eNB semi-statically.

SUMMARY OF THE INVENTION

The technical problem to be solved by the present invention is to provide a network side device and a method for transmitting path loss power threshold configuration information thereof, which can be applied to the grouping process of the random access preamble, so that the eNB can allocate the PUSCH resources for transmitting Msg3 efficiently.

In order to solve the above technical problem, a method for transmitting path loss power threshold configuration information is disclosed in the present invention, comprising:

a network side increasing or reducing a weighted sum value currently selected by a cell according to a scenario of resources which can be allocated in a current cell, updating a random access preamble group B power offset value and a power offset value between a random access preamble and a first scheduled transmission (Msg3) sent over uplink channel resources of the cell respectively according to an increased or reduced weighted sum value, sending the updated random access preamble group B power offset value and the updated power offset value between the random access preamble and Msg3 to a terminal of the cell by the path loss power threshold configuration information, wherein the weighted sum value is a weighted sum value of the random access preamble group B power offset value and the power offset value between the random access preamble and Msg3.

In this case, the step of the network side increasing or reducing the weighted sum value currently selected by the cell according to the scenario of resources which can be allocated in the current cell comprises:

when the scenario of resources which can be allocated in the current cell is that the number of resource blocks which can be allocated to Msg3 in the current cell is sufficient, reducing the weighted sum value currently selected by the cell; and when the scenario or resources which can be allocated in the current cell is that the number of resource blocks which can be allocated to Msg3 in the current cell is insufficient, increasing the weighted sum value currently selected by the cell.

In this case, the step of the network side increasing the weighted sum value currently selected by the cell comprises:

the network side determining all values of weighted sums of the random access preamble group B power offset value and the power offset value between the random access preamble and Msg3 which can be selected by the cell and determining a value sequence of the weighted sums according to a size of value; and when the weighted sum value currently selected by the cell will be increased, the network side selecting a weighted sum value, which is closely adjacent to the weighted sum value currently selected by the cell and greater than the weighted sum value currently selected by the cell, as an increased weighted sum value from the determined value sequence of the weighted sums;

the step of the network side reducing the weighted sum value currently selected by the cell comprises:

the network side determining all values of weighted sums of the random access preamble group B power offset value and the power offset value between the random access preamble and Msg3 which can be selected by the cell and determining the value sequence of the weighted sums according to the size of value; and when the weighted sum value currently selected by the cell will be reduced, the network side selecting a weighted sum value, which is closely adjacent to the weighted sum value currently selected by the cell and less than the weighted sum value currently selected by the cell, as a reduced weighted sum value from the determined value sequence of the weighted sums.

In this case, the step of the network side updating the random access preamble group B power offset value and the power offset value between the random access preamble and Msg3 of the cell respectively according to the increased or reduced weighted sum value comprises:

the network side searching for the random access preamble group B power offset value and the power offset value between the random access preamble and Msg3 which meet calculation of the increased or reduced weighted sum value respectively from all values of the random access preamble group B power offset value which can be selected by the cell and all values of the power offset value between the random access preamble and Msg3 which can be selected by the cell, and updating the random access preamble group B power offset value and the power offset value between the random access preamble and Msg3 of the cell by using a searched-out random access preamble group B power offset value and a searched-out power offset value between the random access preamble and Msg3.

In this case, the step of the network side updating the random access preamble group B power offset value and the power offset value between the random access preamble and Msg3 of the cell respectively according to the increased or reduced weighted sum value further comprises:

when searching for the random access preamble group B power offset value and the power offset value between the random access preamble and Msg3 which meet the calculation of the increased or reduced weighted sum value, if a plurality of random access preamble group B power offset values and a plurality of power offset values between the random access preamble and Msg3 are found, the network side randomly selecting one random access preamble group B power offset value and a corresponding power offset value between the random access preamble and Msg3 from said a plurality of random access preamble group B power offset values and said a plurality of power offset values between the random access preamble and Msg3.

In this case, the weighted sum value of the random access preamble group B power offset value and the power offset value between the random access preamble and Msg3 is: a sum value of the random access preamble group B power offset value and the power offset value between the random access preamble and Msg3.

In this case, the network side performs a long time statistics on the cell and calculates the number of resources $\lambda_{need}$ required to be allocated to Msg3 per second on average and the number of resources $\lambda_{actual}$ actually allocated to Msg3 per second on average, and when $\lambda_{need} < \lambda_{actual}$, the network side judges that the number of resource blocks which can be allocated to Msg3 in the current cell is sufficient, and when $\lambda_{need} > \lambda_{actual}$, the network side judges that the number of resource blocks which can be allocated to Msg3 in the current cell is insufficient.

In this case, the network side performs a long time statistics on the cell and calculates the number of resources $\lambda_{need}$ required to be allocated to Msg3 per second, the number of resources $\lambda_{actual}$ actually allocated to Msg3 per second and the number of UE $N_{UE}$ initiating a random access per second; and when $$\frac{\lambda_{actual} - \lambda_{need}}{N_{UE}} \geq 1 RB,$$

the network side judges that the number of resource blocks which can be allocated to Msg3 in the current cell is sufficient, and when $$\frac{\lambda_{need} - \lambda_{actual}}{N_{UE}} \geq 1 RB,$$

the network judges that the number of resource blocks which can be allocated to Msg3 in the current cell is insufficient.

In order to solve the above technical problem, a network side device is disclosed in the present invention, comprising a processing module and a transmitting module, wherein the processing module is configured to: increase or reduce a weighted sum value currently selected by a cell according to a scenario of resources which can be allocated in a current cell, and update a random access preamble group B power offset value and a power offset value between a random access preamble and a first scheduled transmission (Msg3) sent over uplink channel resources of the cell respectively according to the increased or reduced weighted sum value; and the transmitting module is configured to: send the updated random access preamble group B power offset value and the updated power offset value between the random access preamble and Msg3 to an eNB to which the cell belongs by path loss power threshold configuration information, wherein the weighted sum value is a weighted sum value of the random access preamble group B power offset value and the power offset value between the random access preamble and Msg3.

In this case, the processing module is configured to increase or reduce the weighted sum value currently selected by the cell according to a scenario of resources which can be allocated in the current cell in a following manner:

when the scenario of resources which can be allocated in the current cell is that the number of resource blocks which can be allocated to Msg3 in the current cell is sufficient, reducing the weighted sum value currently selected by the cell; and when the scenario of resources which can be allocated in the current cell is that the number of resource blocks which can be allocated to Msg3 in the current cell is insufficient, increasing the weighted sum value currently selected by the cell.

The device further comprises a storage module, wherein the storage module is configured to determine all values of weighted sums of the random access preamble group B power offset value and the power offset value between the random access and Msg3 which can be selected by the cell and determine a value sequence of the weighted sums according to a sin of value;

the processing module is configured to increase the weighted sum value currently selected by the cell according to a following manner: selecting a weighted sum value, which is closely adjacent to the weighted sum value currently selected by the cell and greater than the weighted sum value currently selected by the cell, as an increased weighted sum value from the value sequence of the weighted sums stored in the storage module; and the processing module is configured to reduce the weighted sum value currently selected by the current cell according to a following manner; selecting a weighted sum value, which is closely adjacent to the weighted sum value currently selected by the cell and less than the weighted sum value currently selected by the cell, as a reduced weighted sum value from the value sequence of the weighted sums stored in the storage module.

In this case, the storage module is further configured to: store all values of the random access preamble group B power offset value which can be selected by the cell, and all values of the power offset value between the random access preamble and Msg3 which can be selected by the cell; and the processing module is further configured to: search for the random access preamble group B power offset value and the power offset value between the random access preamble and Msg3 which meet calculation of the increased or reduced weighted sum value from the storage module, and update the random access preamble group B power offset value and the power offset value between the random access preamble and Msg3 of the cell by using a searched-out random access preamble group B power offset value and a searched-out power offset value between the random access preamble and Msg3.

In the technical solution in the present invention, according to different scenarios of cell, through adjusting the parameters in the path loss power threshold between the UE and the eNB, and the probability for the UE selecting the random access preamble in Group B is increased or reduced, thus it is ensured that when the resources which can be allocated in the cell are insufficient, the eNB can allocate the PUSCH resources for transmitting Msg3 with high efficiency, and when the resources which can be allocated in the cell are sufficient, the Msg3 can be transmitted reliably.

BRIEF DESCRIPTION OF DRAWINGS

FIG. 3 is a flowchart of transmitting path loss power threshold configuration information in the present invention.

PREFERRED EMBODIMENTS OF THE PRESENT INVENTION

Figure 1:
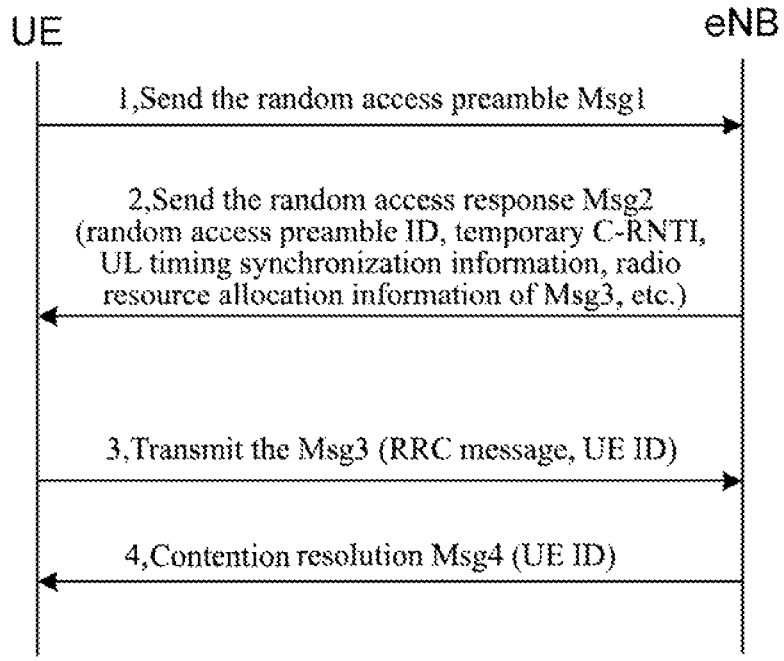
FIG. 1 is a schematic diagram of a contention based random access process in the related art.
Figure 2:
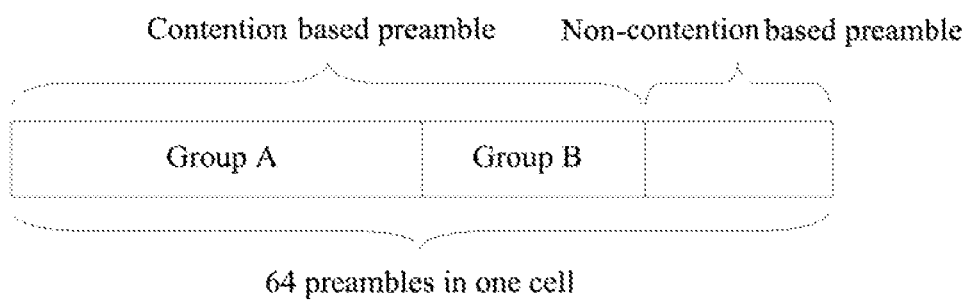
FIG. 2 is a schematic diagram of the category of the existing random access preamble.

In the current LTE system, the UE selects the random access preamble in Group A or B according to the path loss power threshold and Msg3 size threshold. In this case, the Msg3 size threshold is usually configured as a fixed value. However, as to the path loss power threshold, several parameters (the combination of these parameters can be referred to as path loss power threshold configuration information) need to be configured, including the maximum transmitting power $P_{CMAX}$ of the UE, the preamble initial target reception power $P_{0\_PRE}$, the power offset (deltaPreambleMsg3) between the random access preamble and Msg3, and the Group B power offset (messagePowerOffsetGroupB). In this case, these two parameters deltaPreambleMsg3 and messagePowerOffsetGroupB vary within a certain range.

What is proposed in the present invention is that the Operation Administration and Maintenance (OAM) regulates the parameters deltaPreambleMsg3 and messagePowerOffsetGroupB in the path loss power threshold configuration information in the eNB according to different scenarios of the resources which can be allocated in the cell, for controlling the UE to select a suitable random access preamble according to different scenarios, so that the eNB can allocate the PUSCH resources for transmitting Msg3 efficiently.

For example, when the resources which can be allocated in the cell are insufficient, the eNB can reduce the path loss power threshold, i.e. increase the weighted sum value of these two parameters deltaPreambleMsg3 and messagePowerOffsetGroupB, thus these two parameters deltaPreambleMsg3 and messagePowerOffsetGroupB are increased correspondingly so that more UEs select the preamble in Group A, and the network side only needs to allocate 1 RB resource to the Msg3 of the UE, and then the eNB can allocate the PUSCH resources for transmitting Msg3 efficiently.

For another example, when the resources which can be allocated in the cell are sufficient, the eNB can increase the path loss power threshold, i.e. reduce the weighted sum value of these two parameters deltaPreambleMsg3 and messagePowerOffsetGroupB, thus these two parameters deltaPreambleMsg3 and messagePowerOffsetGroupB are reduced correspondingly so that more UEs select the preamble in Group B, and the network side only needs to allocate a plurality of RB resources to the Msg3 of the UE, so as to ensure the performance of Msg3 transmission.

In order to make the object, technical solution and advantages of the present invention more clear, the embodiments of the present invention will be further described in detail in conjunction with the accompanying drawings. It needs to be noted that the embodiments of the present application and the features in the embodiments can be combined with each other if there is no conflict. A network side device, which can be an OAM, can allocate the PUSCH resources for transmitting Msg3 efficiently, and the network side device comprises at least a processing module and a transmitting module, wherein the processing module is configured to: increase or reduce a weighted sum value currently selected by the cell according to the scenario of resources which can be allocated in a current cell, and update the random access preamble group B power offset value and the power offset value between the random access preamble and Msg3 of the cell respectively according to the increased or reduced weighted sum value, wherein the weighted sum value is the weighted sum value of the random access preamble group B power offset value and the power offset value between the random access preamble and Msg3.

In this case, the scenario of resources which can be allocated in the current cell can be determined by the eNB and reported to the present network side device. It also can be as follows: the eNB reports the state information of the current cell to the present network side device, and the present network side device determines the scenario of resources which can be allocated in the current cell according to the received state information of the current cell.

The transmitting module is configured to: send the updated random access preamble group B power offset value and the power offset value between the random access preamble and Msg3 to an eNB to which the cell belongs by path loss power threshold configuration information.

In this case, the processing module is configured to increase or reduce the weighted sum value currently selected by the cell according to the scenario of resources which can be allocated in the current cell in a following manner: when the scenario of resources which can be allocated in the current cell is that the number of resource blocks which can be allocated to Msg3 in the current cell is sufficient, reducing the weighted sum value currently selected by the cell; when the scenario of resources which can be allocated in the current cell is that the number of resource blocks which can be allocated to Msg3 in the current cell is insufficient, increasing the weighted sum value currently selected by the cell.

In a preferred embodiment, the above network side device further comprises a storage module, wherein the storage module is configured to determine all the values of the weighted sums of the random access preamble group B power offset value and the power offset value between the random access preamble and Msg3 which can be selected by the cell, determine a value sequence of the weighted sums according to the size of value, and store all the values of the random access preamble group B power offset value which can be selected by the cell and all the values of the power offset value between the random access preamble and Msg3 which can be selected by the cell;

the processing module is further configured to: when the weighted sum value currently selected by the cell will be increased, select a weighted sum value, which is closely adjacent to the weighted sum value currently selected by the cell and greater than the weighted sum value currently selected by the cell, as an increased weighted sum value from the value sequence of the weighted sums stored in the storage module;

when the weighted sum value currently selected by the cell will be reduced, select a weighted sum value, which is closely adjacent to the weighted sum value currently selected by the cell and less than the weighted sum value currently selected by the cell, as a reduced weighted sum value from the value sequence of the weighted sums stored in the storage module; and search for the random access preamble group B power offset value and the power offset value between the random access preamble and Msg3 which meet calculation of the increased or reduced weighted sum value from the storage module, and update the random access preamble group B power offset value and the power offset value between the random access preamble and Msg3 of the cell by using the searched-out random access preamble group B power offset value and the power offset value between the random access preamble and Msg3.

Hereinafter, the particular process of transmitting the random access public configuration information to UE is introduced.

This embodiment takes a certain LTE cell with 10 MHz bandwidth as an example, wherein assuming that the cell has a random access preamble Group B. According to the current LTE protocol, as to three types of random accesses of radio resource control protocol connection (RRC_Connection) establishment, reestablishment and downlink data arrival, it is enough for Msg3 size to be 56 bits, however, as to two random accesses of handover and uplink data arrival, the range of Msg3 size is from 56 bits to 184 bits, and at this moment, the message threshold is set as messageSizeGroupA=56 bits, i.e. the Msg3 size in Group A is 56 bits, and the range of the Msg3 size in Group B is from 56 bits to 184 bits. The eNB configures the maximum transmitting power of the UE $P_{CMAX}=23$ dBm, and the preamble initial target reception power is configured as $P_{0\_PRE}=-114$ dBm.

Hereinafter, the above cell will be taken as an example, and the process of transmitting the random access public configuration information is as shown in FIG. 3 and includes the following steps:

in step 300, the network side judges whether the random access preamble of the cell has Group B, and if yes, then it sets Msg3 size threshold messageSizeGroupA according to the Msg3 size of the random access initiated for different reasons;

in step 301, the network side sets the maximum transmitting power $P_{CMAX}$ of the UE and the preamble initial target reception power $P_{0\_PRE}$ in the path loss power threshold configuration information;

in step 302, the network side determines the number of RBs $N_{RB\_B}$ which can be allocated to the Msg3 of the UE in Group B and M combination ranges $(N_{RB\_B}, I_{MCS})$ of the MCS index $I_{MCS}$, and calculates the value $R_{messagePowerPffsetGroupB}(m)$ of messagePowerOffsetGroupB according to $(N_{RB\_B}, I_{MCS})$, $0 \leq m \leq M-1$, i.e. determine the corresponding relation between messagePowerOffsetGroupB and $N_{RB\_B}$ and $I_{MCS}$;

For example, when the range of the Msg3 size of the UE in Group B of the cell is >56 bits~184 bits, and according to the scheduling algorithm of Msg3, assuming that the number of RBs which can be allocated to the Msg3 of the UE in Group B is 2~3, if the number of RBs allocated to the Msg3 of the UE in Group B and the combination range $(N_{RB\_B}, I_{MCS})$ of the MCS index include: (2,2), (2,3), (2,4), (2,5), (2,6), (2,7), (3,1), (3,2), (3,3) and (3,4), wherein $N_{RB\_B}$ represents the number of RBs allocated to the Msg3 of the UE in Group B, and $I_{MCS}$ represents the MCS index allocated to the Msg3 of the UE in Group B. Then, messagePowerOffsetGroupB can be calculated according to the following equation:

$$messagePowerOffsetGroupB = \Delta_{TF\_B} + 10\log_{10}(N_{RB\_B})$$

$$\begin{cases} \Delta_{TF\_B} = 10\log_{10}(2^{1.25 MPR} - 1) \\ MPR = TBS / N_{RE} \\ N_{RE} = 2 N_{RB\_B} \cdot N_{se}^{RB} \cdot N_{symb}^{UL} \end{cases}$$

In the above equation, $\Delta_{TF}(i)$ is MCS based power offset, MPR is modulation power ration, $N_{RB\_B}$ is the number of RBs in the Msg3 of the UE in Group B, TBS, i.e. transport block size, is the size of the Msg3 of the UE in Group B in Transport Block (TB) of different $I_{MCS}$, $N_{RE}$ is the number of Resource Elements in Msg3, $N_{sc}^{RB}$ is the number of subcarriers in each RB block, and $N_{symb}^{UE}$ is the number of symbols of a Single Carrier Frequency Division Multiple Access (SC-FDMA) in one uplink slot.

Therefore, the corresponding relation between the value $R_{messagePowerOffsetGroupB}(N_{RB\_B}, I_{MCS})$ of the messagePowerOffsetGroupB and $(N_{RB\_B}, I_{MCS})$ shown in Table 1 can be obtained.

TABLE 1

Table of the corresponding relation between messagePowerOffsetGroupB and $(N_{RB\_B}, I_{MCS})$

| $R_{messagePowerOffsetGroupB}$ $(N_{RB\_B}, I_{MCS})$ | $N_{RB\_B} = 2$ | $N_{RB\_B} = 3$ |
|---|---|---|
| $I_{MCS} = 1$ | — | 0 |
| $I_{MCS} = 2$ | 0 | 3 |

TABLE 1-continued

Table of the corresponding relation between
messagePowerOffsetGroupB and ($N_{RB\_B}$, $I_{MCS}$)

| $R_{messagePowerOffsetGroupB}$ ($N_{RB\_B}$, $I_{MCS}$) | $N_{RB\_B} = 2$ | $N_{RB\_B} = 3$ |
|---|---|---|
| $I_{MCS} = 3$ | 0 | 3 |
| $I_{MCS} = 4$ | 0 | 3 |
| $I_{MCS} = 5$ | 3 | — |
| $I_{MCS} = 6$ | 3 | — |
| $I_{MCS} = 7$ | 3 | — |

In step 303, the network side determines N MCS index ranges $I_{MCS}$ which can be allocated to the Msg3 of the UE in Group B according to the range of Msg3 size of UE in Group B, and calculate and obtain the range of deltaPreambleMsg3 $R_{deltaPreambleMsg3}(n)$, $0 \leq n \leq N-1$, i.e. determine the corresponding relation between deltaPreambleMsg3 and $I_{MCS}$;

For example, when the $I_{MCS}$ index range which can be allocated to the Msg3 of the UE in Group B is from 1 to 7, deltaPreambleMsg3 can also be calculated according to the following equation:

deltaPreambleMsg3($I_{MCS}$)=(SINR$_{0\_Msg3}$($I_{MCS}$)−
SINR$_{0\_PRE}$)+(IoT$_{Msg3}$($I_{MCS}$)−IoT$_{PRE}$)−10·log(6)

wherein SINR$_{0\_Msg3}$ is the working point signal to noise ratio of Msg3 at $I_{MCS}$, SINR$_{0\_PRE}$ is the working point signal to noise ratio of Preamble, IoT$_{Msg3}$ is the PUSCH interference over thermal noise of Msg3 at $I_{MCS}$, and IoT$_{PRE}$ is the interference over thermal noise of physical random access channel (PRACH).

The corresponding relation between the value $R_{deltaPreambleMsg3}(I_{MCS})$ of the power offset between the random access preamble and Msg3 deltaPreambleMsg3 and $I_{MCS}$ can be obtained as shown in Table 2.

TABLE 2

Table of corresponding relation between
deltaPreambleMsg3 and $I_{MCS}$

| | RdeltaPreambleMsg3 (IMCS) |
|---|---|
| IMCS = 1 | 0 |
| IMCS = 2 | 0 |
| IMCS = 3 | 0 |
| IMCS = 4 | 2 |
| IMCS = 5 | 2 |
| IMCS = 6 | 2 |
| IMCS = 7 | 4 |

The operations of the above steps 302 and 303 can also be performed simultaneously, or step 303 is firstly performed and then step 302 is performed.

In step 304, the network side calculates the weighted sum of messagePowerOffsetGroupB and deltaPreambleMsg3 according to the $R_{messagePowerOffsetGroupB}(m)$ and $R_{deltaPreambleMsg3}(n)$ calculated in the above steps 302 and 303, i.e. determine the corresponding relation between the weighted sum of messagePowerOffsetGroupB and deltaPreambleMsg3 and $N_{RB\_B}$, $I_{MCS}$;

in this embodiment, the weighted sum of messagePowerOffsetGroupB and deltaPreambleMsg3 $R_{all}(k) = R_{deltaPreambleMsg3}(n) + R_{messagePowerOffsetGroupB}(m)$, $0 \leq k \leq K-1$, $K \leq M+N$, i.e. in this embodiment, the weight coefficients of messagePowerOffsetGroupB and deltaPreambleMsg3 are equal to 1; and in the other application scenarios, the weight coefficients of messagePowerOffsetGroupB and deltaPreambleMsg3 may not be equal, as long as it can be ensured that the weight coefficients of messagePowerOffsetGroupB and deltaPreambleMsg3 are greater than 0;

in particular, in this embodiment, the corresponding relation between Rall and ($N_{RB\_B}$, $I_{MCS}$) as shown in Table 3 can be obtained according to the above Tables 1 and 2:

TABLE 3

Table of corresponding relation between
Rall and (NRB_B, IMCS)

| Rall(NRB_B, IMCS) [dB] | NRB_B = 2 | NRB_B = 3 |
|---|---|---|
| IMCS = 0 | — | — |
| IMCS = 1 | — | 0 |
| IMCS = 2 | 0 | 3 |
| IMCS = 3 | 0 | 3 |
| IMCS = 4 | 2 | 5 |
| IMCS = 5 | 5 | — |
| IMCS = 6 | 5 | — |
| IMCS = 7 | 7 | — |

$R_{all}(k)$ is obtained by sorting the $R_{all}(N_{RB\_B}, I_{MCS})$ in Table 3 from small to large (or from large to small in other scenarios), i.e. $R_{all}(k) = \{0, 2, 3, 5, 7\}$, $0 \leq k \leq K-1$, $K=5$.

In step 305, the network side determines the scenario of resources which can be allocated in a current cell and selects the corresponding $R_{all}(k)$ according to the determined scenario;

in this step, if it is the initial stage, $R_{all}(k)$ is firstly selected, then the median value of all the values of $R_{all}(k)$ can be selected, i.e.

$$k = \left\lceil \frac{K-1}{2} \right\rceil.$$

K is the maximum serial number of $R_{all}$; and in some scenarios, the initial $R_{all}(k)$ can also be selected as the minimum value based on the consideration of saving resources, i.e. $R_{all}(0)$.

If it is not the initial stage, the network side performs a long time statistics on the cell under the working state and calculates the number of resources $\lambda_{need}$ required to be allocated to Msg3 per second and the number of the resources $\lambda_{actual}$ actually allocated to Msg3 per second, and when $\lambda_{need} = \lambda_{actual}$, it is determined that the scenario of resources which can be allocated in a current cell is that the resources which can be allocated in the cell are normal, then $R_{all}(k)$ need not be adjusted, when $\lambda_{need} > \lambda_{actual}$, it is determined that the scenario of resources which can be allocated in a current cell is that the resources which can be allocated in the cell are insufficient, then the value of $R_{all}(k)$ is increased, i.e. selecting one from all the values of the ranked $R_{all}(k)$ which is closely adjacent to the current $R_{all}(k)$ and greater than the value of current $R_{all}(k)$; when $\lambda_{need} < \lambda_{actual}$, it is determined that the scenario of resources which can be allocated in a current cell is that the resources which can be allocated in the cell are sufficient, then the value $R_{all}(k)$ is reduced, i.e. selecting one from all the values of the ranked $R_{all}(k)$ which is closely adjacent to the current $R_{all}(k)$ and less than the value of current $R_{all}(k)$, wherein when the network side adjusts $R_{all}(k)$ according to the scenario of resources which can be allocated in a current cell, it only carries out adjustment within the value range of $R_{all}(k)$, i.e. when the resources which can be allocated by the cell are insufficient and the value of $R_{all}(k)$ need be increased, if the value of $R_{all}(k)$ has already been the maximum value of $R_{all}(k)$ before adjustment, then the value of $R_{all}(k)$ will no longer be increased, likewise, when the resources which can be allocated by the cell are sufficient and the value of $R_{all}(k)$ need be reduced, if the value of $R_{all}(k)$ has already been the minimum value of $R_{all}(k)$ before adjustment, then the value of Rall(k) will no longer be reduced.

In a preferred embodiment, not only $\lambda_{need}$ and $\lambda_{actual}$ are used to judge the scenario but also the judgment is carried out according to the number of UEs $N_{UE}$ initiating random access per second. In particular, when $$\frac{|\lambda_{actual} - \lambda_{need}|}{N_{UE}} < 1 RB,$$

it indicates that the current parameter (i.e. the currently configured messagePowerOffsetGroupB and deltaPreambleMsg3) configuration is suitable, i.e. it is determined that the scenario of resources which can be allocated in a current cell is that the resources which can be allocated by the cell are normal, and $R_{all}(k)$ need not be adjusted; when $$\frac{\lambda_{actual} - \lambda_{need}}{N_{UE}} \geq 1 RB,$$

it indicates mat one more RB resource block can be allocated to the Msg3 of each UE additionally, i.e. it is determined that the scenario of resources which can be allocated in a current cell is that the resources which can be allocated by the cell are sufficient, then the value of $R_{all}(k)$ will be reduced for reducing the currently configured messagePowerOffsetGroupB and deltaPreambleMsg3, and when $$\frac{\lambda_{need} - \lambda_{actual}}{N_{UE}} \geq 1 RB,$$

it indicates that one less RB resource block need be allocated to the Msg3 of each UE, i.e. it is determined that the scenario of resources which can be allocated in a current cell is that the resources which can be allocated by the cell are insufficient, then the value of Rall(k) will be increased for increasing the currently configured messagePowerOffsetGroupB and deltaPreambleMsg3;

in particular, since in this embodiment $R_{all}(k)=\{0, 2, 3, 5, 7\}$, $0 \leq k \leq K-1$, $K=5$, reducing $R_{all}(k)$ refers to selecting $R_{all}(k-1)$, and increasing $R_{all}(k)$ refers to selecting $R_{all}(k+1)$;

in step 306, the $R_{deltaPreambleMsg3}(n)$ and $R_{messagePowerOffsetGroupB}(m)$ corresponding to the selected Rall(k) is determined from the corresponding relation between $R_{all}(k)$ and $R_{deltaPreambleMsg3}(n)$ and $R_{messagePowerOffsetGroupB}(m)$, and the path loss power threshold information including the maximum transmitting power of the UE $P_{CMAX}$, the preamble initial target reception power $P_{0\_PRE}$, $R_{deltaPreambleMsg3}(n)$ and $R_{messagePowerOffsetGroupB}(m)$ is sent to the UE by way of a system message;

in this step, when it is determined that there is a plurality of $R_{deltaPreambleMsg3}(n)$ and $R_{messagePowerOffsetGroupB}(m)$ corresponding to the selected Rall(k) from the corresponding relation between $R_{all}(k)$ and $R_{deltaPreambleMsg3}(n)$ and $R_{messagePowerOffsetGroupB}(m)$, one $R_{deltaPreambleMsg3}(n)$ and $R_{messagePowerOffsetGroupB}(m)$ can be randomly selected therefrom, and in a preferred embodiment, the $R_{messagePowerOffsetGroupB}(m)$ with less RBs of the Msg3 of the UE in Group B can be selected, and then $R_{deltaPreambleMsg3}(n)$ is selected through the selected $R_{messagePowerOffsetGroupB}(m)$;

in particular, after having selected the corresponding $R_{all}(k)$ according to the scenario of resources which can be allocated by the cell, the network side can select the corresponding $R_{deltaPreambleMsg3}(n)$ and $R_{messagePowerOffsetGroupB}(m)$ from the above Tables 1, 2 and 3, wherein after the corresponding $R_{all}(k)$ is selected, a plurality of $R_{deltaPreambleMsg3}(n)$ and $R_{messagePowerOffsetGroupB}(m)$ may be selected from Tables 1, 2 and 3, and at this moment, one $R_{deltaPreambleMsg3}(n)$ and $R_{messagePowerOffsetGroupB}(m)$ can be randomly selected therefrom, or the selection can be carried out by determining which parameter is primary according to the priorities of the $N_{RB\_B}$ and $I_{MCS}$ in these two parameters, for example, when $R_{all}(k)$ is selected as 5, the selectable messagePowerOffsetGroupB has $R_{deltaPreambleMsg3}(3,4)$ and $R_{deltaPreambleMsg3}(2,5)$, and the selectable deltaPreambleMsg3 has $R_{deltaPreambleMsg3}(4)$ and $R_{deltaPreambleMsg3}(5)$, and if the priority of $N_{RB\_B}$ is higher than that of $I_{MCS}$, then $N_{RB\_B}$ will be the primary option, and considering the resource-saving principle, $R_{deltaPreambleMsg3}(2,5)$ corresponding to the smaller value of $N_{RB\_B}$ will be selected, thus $R_{deltaPreambleMsg3}(5)$ can be selected.

In step 307, the UE determines and configures the path loss power threshold RACH_MSG3_THRESHOLD according to the received system message;

in this step, the UE acquires the deltaPreambleMsg3, messagePowerOffsetGroupB, $P_{CMAX}$ and $P_{0\_PRE}$ in the path loss power threshold configuration information obtained from the system message, and can determine the path loss power threshold RACH_MSG3_THRESHOLD according to the following equation:

$$RACH\_MSG3\_THRSHOLD = P_{CMAX} - P_{0\_PRE} - deltaPreambleMsg3 - messagePowerOffsetGroupB$$

After running for a long time, the system needs to update the system parameter configuration, and the network side returns to step 305 and reselects $R_{all}(k)$ and re-configures the path loss power threshold RACH_MSG3_THRESHOLD according to step 306, so as to achieve the object of self-optimizing configuration.

In particular, in the above flow, assuming that it is obtained by performing a long time statistics on a cell of the LTE system with 10 MHz bandwidth that in this cell, there are 200 UEs per second needing to schedule Msg3 after having successfully transmitted the random access preamble (i.e. the number of UEs $N_{UE}$ initiating random access per second is 200), and the number of resources $\lambda_{need}$ required to be allocated to the Msg3 per second is 200 RB resources, and the number of resources $\lambda_{actual}$ actually allocated to the Msg3 per second is 420 RB resources, and the weighted sum of the $R_{deltaPreambleMsg3}(n)$ and $R_{messagePowerOffsetGroupB}(m)$ selected by the current cell is $R_{all}(2)=3$ dB: then, the network side determines $$\frac{\lambda_{actual} - \lambda_{need}}{N_{UE}} \geq 1 RB$$

according to the operation of the above step 305, judges that scenario of resources which can be allocated in a current cell is that the resources which can be allocated by the cell are sufficient, and reduces the current $R_{all}(2)$ to be $R_{all}(1)$, i.e. $R_{all}(1)=2$ dB (refer to Table 3);

then, the network side learns from the corresponding relation of Tables 1, 2 and 3 according to the operation of the above step 306 that when $R_{all}(2)=2$ dB, $(N_{RB\_B}, I_{MCS})$ can be (2, 4), therefore $(N_{RB\_B}, I_{MCS})=(2, 4)$, i.e. determining $R_{deltaPreambleMsg3}(2)=2$ dB, and $R_{messagePowerOffsetGroupB}(2,4)=0$ dB, and sending the determined deltaPreambleMsg3 and messagePowerOffsetGroupB to the terminal.

The terminal receives deltaPreambleMsg3 and messagePowerOffsetGroupB, and recalculates and reconfigures path loss power threshold RACH_MSG3_THRESHOLD according to the above step 307, wherein the calculation result is as follows:

$$\begin{aligned} \text{RACH\_MSG3\_THRESHOLD} &= P_{CMAX} - P_{0\_PRE} - deltaPreambleMsg3 - \\ & \quad messagePowerOffsetGroupB \\ &= 23 \text{ dBm} - 114 \text{ dBm} - 2 \text{ dB} - 0 \text{ dB} \\ &= -93 \text{ dBm} \end{aligned}$$

For another example, assuming that it is obtained by performing a long time statistics in a cell of the LTE system with 10 MHz bandwidth that in this cell, there are 200 UEs per second needing to schedule Msg3 after having successfully transmitted the random access preamble (i.e. the number of UEs $N_{UE}$ initiating random access per second is 200), and the number of resources $\lambda_{need}$ required to be allocated to the Msg3 per second is 500 RB resources, and the number of resources $\lambda_{actual}$ actually allocated to the Msg3 per second is 250 RB resources, and the weighted sum of the $R_{deltaPreambleMsg3}(n)$ and $R_{messagePowerOffsetGroupB}(n)$ selected by the current cell is $R_{all}(2)=3$ dB:

then, the network side determines $$\frac{\lambda_{need} - \lambda_{actual}}{N_{UE}} \geq 1 RB$$

according to the operation of the above step 305, judges that the scenario of resources which can be allocated in a current cell is that the resources which can be allocated by the cell are insufficient, and increases the current $R_{all}(2)$ to $R_{all}(3)$ i.e. $R_{all}(3)=5$ dB (refer to Table 3);

then, the network side learns from the corresponding relation of Tables 1, 2 and 3 according to the operation of the above step 306 that when $R_{all}(2)=2$ dB, $(N_{RB\_B}, I_{MCS})$ can be (2, 5), (2, 6) or (3, 4), and at this moment, any $(N_{RB\_B}, I_{MCS})$ can be selected therefrom, for example, when it is selected that $(N_{RB\_B}, I_{MCS})=(2, 5)$, it is determined that $R_{deltaPreambleMsg3}(2)=2$ dB, and $R_{messagePowerOffsetGroupB}(2,5)=3$ dB, and the determined deltaPreambleMsg3 and messagePowerOffsetGroupB are sent to the terminal.

The terminal receives deltaPreambleMsg3 and messagePowerOffsetGroupB, and recalculates and reconfigures path loss power threshold RACH_MSG3_THRESHOLD according to the above step 307, and the calculation result is as follows:

$$\begin{aligned} \text{RACH\_MSG3\_THRESHOLD} &= P_{CMAX} - P_{0\_PRE} - deltaPreambleMsg3 - \\ & \quad messagePowerOffsetGroupB \\ &= 23 \text{ dBm} - 114 \text{ dBm} - 2 \text{ dB} - 3 \text{ dB} \\ &= -96 \text{ dBm} \end{aligned}$$

Figure 4:
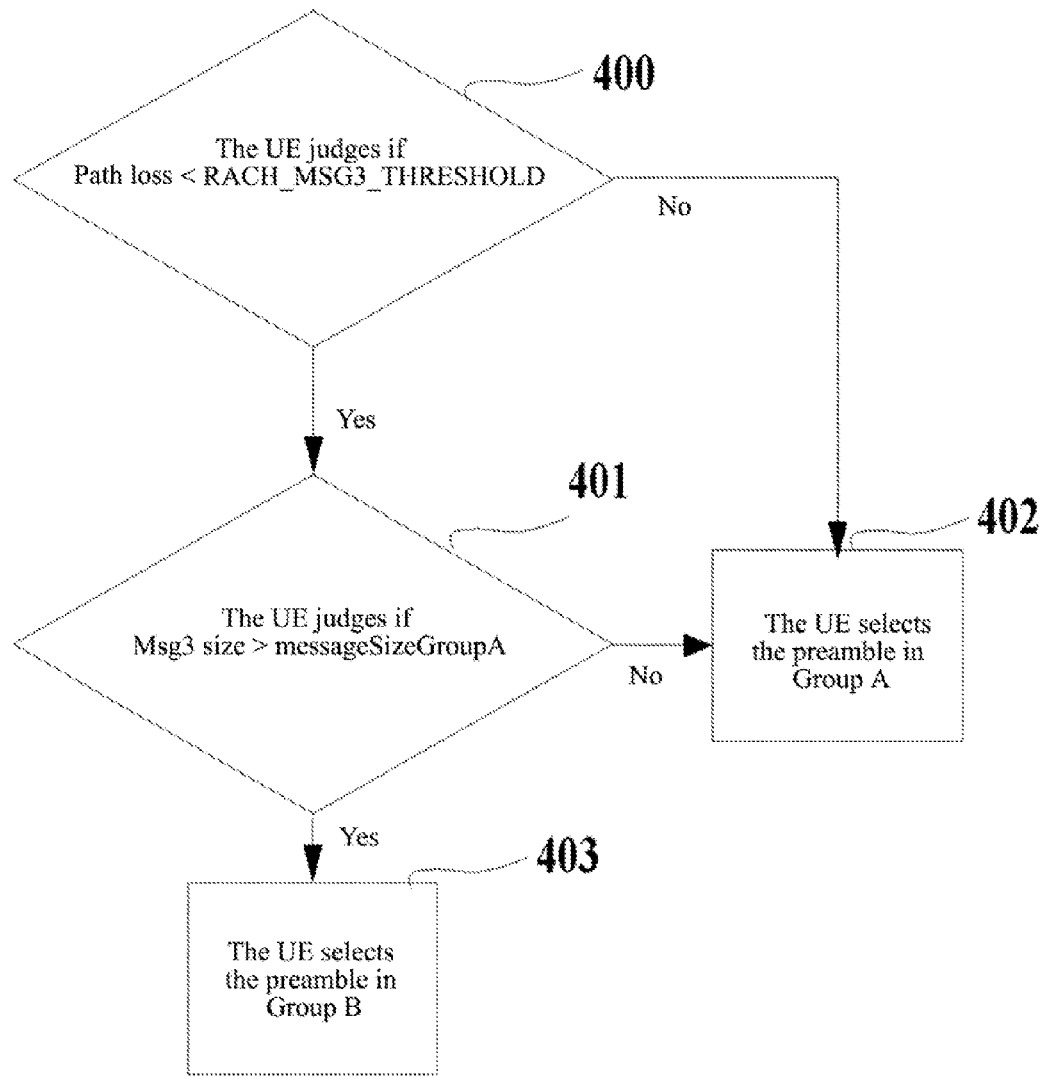
FIG. 4 is a flowchart of the UE selecting random access preamble Group A or B.

In the above flow, the particular flow for the UE to select the random access preamble Group A or B is as shown in FIG. 4, including the following steps:

in step 400, the UE judges whether or not path loss<RACH_MSG3_THRESHOLD, and if yes, then proceed to step 401, otherwise, proceed to step 402;

in this case, RACH_MSG3_THRESHOLD is the path loss power threshold of the Msg3, and it can be represented by using the following equation:

RACH_MSG3_THRESHOLD=$P_{CMAX}$-$P_{O\_PRE}$-deltaPreambleMsg3-messagePowerOffsetGroupB in step 401, the UE judges whether or not Msg3 size>messageSizeGroupA, and if yes, then proceed to step 403, otherwise, proceed to step 402:

in this case, messageSizeGroupA is the Msg3 size threshold.

In step 402, the UE selects the preamble in Group A, and the current flow ends; and in step 403, the UE selects the preamble in Group B.

It can be seen from the above embodiments that in the technical solution in the present invention, the parameters in the path loss power threshold between the UE and the eNB are adjusted by the eNB according to different cell scenarios, and the probability for the LIE to select the random access preamble in Group B is increased or reduced, thus it is ensured that when the resources which can be allocated by the cell are insufficient, the eNB can allocate the PUSCH resources for transmitting Msg3 with high efficiency, and when the resources which can be allocated by the cell are sufficient, the Msg3 can be transmitted reliably.

For example, when the resources which can be allocated by the cell are insufficient, the eNB reduces the threshold by setting the path loss power threshold parameter to let more UEs to select the preamble in Group A, so that the eNB can allocate the PUSCH resources for transmitting Msg3 efficiently. As to the UE selecting the preamble in Group A, the eNB will allocate 1 RB to the Msg3 of the UE, and in the situation where the transmitting power of the UE is limited, the transmission performance of the Msg3 may not be ensured, however, the uplink RB resources can be used efficiently by retransmitting the Msg3. For example, the transmitting power of 23 dBm is employed for one UE, 2 RBs are used to send the Msg3, and the block error rate of the Msg3 is 1%; if the transmitting power of 23 dBm is employed for the UE, 1 RB is used to send the Msg3, and the block error rate of the Msg3 is 20%, and as to the latter situation, 80% of Msg3 can be transmitted successfully by only 1 RB, and the remaining 20% of Msg3 may need 2 times to be transmitted successfully in the manner of retransmission, then it requires 0.8+0.2*2=1.2 RB on average, and as to the first situation, 2 RBs are always needed to transmit the Msg3.

However, when the resources which can be allocated by the cell are sufficient, the eNB increases the threshold by setting the path loss power threshold parameter to let more UEs to select the preamble in Group B, so as to ensure the transmission performance of the Msg3. As to the UE selecting the preamble in Group B, the eNB will allocate 2 RBs or more than 2 RBs resources to the Msg3 of the LIE, and in the situation where the transmitting power of the UE is limited, the transmission reliability of the Msg3 occupying 2 RBs will be higher than that of the Msg3 only occupying 1 RB.

Those skilled in the art shall understand that all or part of the steps in the above methods can be completed by instructing relevant hardware through programs, and the programs can be stored in a computer readable storage medium, such as read only memory, magnetic disk, or optical disk, etc. Optionally, all of or part of the steps of the above embodiments can also be implemented by using one or more integrated circuits. Accordingly, the modules/units in the above embodiments can be implemented in the form of hardware and can also be implemented in the form of software function modules. The present invention is not limited to any particular form of combination of hardware and software.

What is described above is merely preferred embodiments of the present invention, and not intended to limit the protection scope of the present invention. The protection scope of the present invention shall comprise any modification, equivalent substitution and improvement and so on within the spirit and principle of the present invention.

INDUSTRIAL APPLICABILITY

In the technical solution of the present invention, the parameters in the path loss power threshold between the UE and the eNB are adjusted according to different cell scenarios, and the probability for the UE to select the random access preamble in Group B is increased or reduced, thus it is ensured that when the resources which can be allocated by the cell are insufficient, the eNB can allocate the PUSCH resources for transmitting Msg3 with high efficiency, and when the resources which can be allocated by the cell are sufficient, the Msg3 can be transmitted reliably.

I claim:

1. A method for transmitting path loss power threshold configuration information, comprising:
a network side increasing or reducing a weighted sum value currently selected by a cell according to a scenario of resources which can be allocated in a current cell, updating a random access preamble group B power offset value and a power offset value between a random access preamble and a first scheduled transmission (Msg3) sent over uplink channel resources of the cell respectively according to an increased or reduced weighted sum value, sending the updated random access preamble group B power offset value and the updated power offset value between the random access preamble and the Msg3 to a terminal of the cell by the path loss power threshold configuration information, wherein the weighted sum value is a weighted sum value of the random access preamble group B power offset value and the power offset value between the random access preamble and the Msg3.

2. The method as claimed in claim 1, wherein
the step of the network side increasing or reducing the weighted sum value currently selected by the cell according to the scenario of resources which can be allocated in the current cell comprises:
when the scenario of resources which can be allocated in the current cell is that the number of resource blocks which can be allocated to the Msg3 in the current cell is sufficient, reducing the weighted sum value currently selected by the cell; and
when the scenario of resources which can be allocated in the current cell is that the number of resource blocks which can be allocated to the Msg3 in the current cell is insufficient, increasing the weighted sum value currently selected by the cell.

3. The method as claimed in claim 2, wherein
the step of the network side increasing the weighted sum value currently selected by the cell comprises:
the network side determining all values of weighted sums of the random access preamble group B power offset value and the power offset value between the random access preamble and the Msg3 which can be selected by the cell and determining a value sequence of the weighted sums according to a size of value; and
when the weighted sum value currently selected by the cell will be increased, the network side selecting a weighted sum value, which is closely adjacent to the weighted sum value currently selected by the cell and greater than the weighted sum value currently selected by the cell, as an increased weighted sum value from the determined value sequence of the weighted sums;
the step of the network side reducing the weighted sum value currently selected by the cell comprises:
the network side determining all values of weighted sums of the random access preamble group B power offset value and the power offset value between the random access preamble and the Msg3 which can be selected by the cell and determining the value sequence of the weighted sums according to the size of value; and
when the weighted sum value currently selected by the cell will be reduced, the network side selecting a weighted sum value, which is closely adjacent to the weighted sum value currently selected by the cell and less than the weighted sum value currently selected by the cell, as a reduced weighted sum value from the determined value sequence of the weighted sums.

4. The method as claimed in claim 3, wherein
the step of the network side updating the random access preamble group B power offset value and the power offset value between the random access preamble and the Msg3 of the cell respectively according to the increased or reduced weighted sum value comprises:
the network side searching for the random access preamble group B power offset value and the power offset value between the random access preamble and the Msg3 which meet calculation of the increased or reduced weighted sum value respectively from all values of the random access preamble group B power offset value which can be selected by the cell and all values of the power offset value between the random access preamble and the Msg3 which can be selected by the cell, and updating the random access preamble group B power offset value and the power offset value between the random access preamble and the Msg3 of the cell by using a searched-out random access preamble group B power offset value and a searched-out power offset value between the random access preamble and the Msg3.

5. The method as claimed in claim 4, wherein the step of the network side updating the random access preamble group B power offset value and the power offset value between the random access preamble and the Msg3 of the cell respectively according to the increased or reduced weighted sum value further comprises:
when searching for the random access preamble group B power offset value and the power offset value between the random access preamble and the Msg3 which meet the calculation of the increased or reduced weighted sum value, if a plurality of random access preamble group B power offset values and a plurality of power offset values between the random access preamble and the Msg3 are found, the network side randomly selecting one random access preamble group B power offset value and a corresponding power offset value between the random access preamble and the Msg3 from said a plurality of random access preamble group B power offset values and said a plurality of power offset values between the random access preamble and the Msg3.

6. The method as claimed in claim 1, wherein
the weighted sum value of the random access preamble group B power offset value and the power offset value between the random access preamble and the Msg3 is: a sum value of the random access preamble group B power offset value and the power offset value between the random access preamble and the Msg3.

7. The method as claimed in claim 2, wherein
the network side performs a long time statistics on the cell and calculates the number of resources $\lambda_{need}$ required to be allocated to the Msg3 per second on average and the number of resources $\lambda_{actual}$ actually allocated to the Msg3 per second on average, and when $\lambda_{need} < \lambda_{actual}$, the network side judges that the number of resource blocks which can be allocated to the Msg3 in the current cell is sufficient, and when $\lambda_{need} > \lambda_{actual}$, the network side judges that the number of resource blocks which can be allocated to Msg3 in the current cell is insufficient.

8. The method as claimed in claim 2, wherein
the network side performs a long time statistics on the cell and calculates the number of resources $\lambda_{need}$ required to be allocated to Msg3 per second on average, the number of resources $\lambda_{actual}$ actually allocated to Msg3 per second on average and the number of UEs $N_{UE}$ initiating a random access per second on average; and
when $$\frac{\lambda_{actual} - \lambda_{need}}{N_{UE}} \geq 1 RB,$$

the network side judges that the number of resource blocks which can be allocated to the Msg3 in the current cell is sufficient, and when $$\frac{\lambda_{need} - \lambda_{actual}}{N_{UE}} \geq 1 RB,$$

the network judges that the number of resource blocks which can be allocated to the Msg3 in the current cell is insufficient.

9. A network side device, comprising a hardware implemented processing module and a hardware implemented transmitting module, wherein
the hardware implemented processing module is configured to: increase or reduce a weighted sum value currently selected by a cell according to a scenario of resources which can be allocated in a current cell, and update a random access preamble group B power offset value and a power offset value between a random access preamble and a first scheduled transmission (Msg3) sent over uplink channel resources of the cell respectively according to the increased or reduced weighted sum value; and
the hardware implemented transmitting module is configured to: send the updated random access preamble group B power offset value and the updated power offset value between the random access preamble and the Msg3 to an eNB to which the cell belongs by path loss power threshold configuration information, wherein the weighted sum value is a weighted sum value of the random access preamble group B power offset value and the power offset value between the random access preamble and the Msg3.

10. The device as claimed in claim 9, wherein
the processing module is configured to increase or reduce the weighted sum value currently selected by the cell according to the scenario of resources which can be allocated in the current cell in a following manner:
when the scenario of resources which can be allocated in the current cell is that the number of resource blocks which can be allocated to the Msg3 in the current cell is sufficient, reducing the weighted sum value currently selected by the cell; and
when the scenario of resources which can be allocated in the current cell is that the number of resource blocks which can be allocated to the Msg3 in the current cell is insufficient, increasing the weighted sum value currently selected by the cell.

11. The device as claimed in claim 10, further comprising a storage module, wherein
the storage module is configured to determine all values of weighted sums of the random access preamble group B power offset value and the power offset value between the random access and the Msg3 which can be selected by the cell and determine a value sequence of the weighted sums according to a size of value;
the processing module is configured to increase the weighted sum value currently selected by the cell according to a following manner: selecting a weighted sum value, which is closely adjacent to the weighted sum value currently selected by the cell and greater than the weighted sum value currently selected by the cell, as an increased weighted sum value from the value sequence of the weighted sums stored in the storage module; and
the processing module is configured to reduce the weighted sum value currently selected by the current cell according to a following manner: selecting a weighted sum value, which is closely adjacent to the weighted sum value currently selected by the cell and less than the weighted sum value currently selected by the cell, as a reduced weighted sum value from the value sequence of the weighted sums stored in the storage module.

12. The device as claimed in claim 11, wherein
the storage module is further configured to: store all values of the random access preamble group B power offset value which can be selected by the cell, and all values of the power offset value between the random access preamble and the Msg3 which can be selected by the cell; and
the processing module is further configured to: search for the random access preamble group B power offset value and the power offset value between the random access preamble and the Msg3 which meet calculation of the increased or reduced weighted sum value from the storage module, and update the random access preamble group B power offset value and the power offset value between the random access preamble and the Msg3 of the cell by using a searched-out random access preamble group B power offset value and a searched-out power offset value between the random access preamble and the Msg3.

13. The method as claimed in claim 2, wherein
the weighted sum value of the random access preamble group B power offset value and the power offset value between the random access preamble and the Msg3 is: a sum value of the random access preamble group B power offset value and the power offset value between the random access preamble and the Msg3.

14. The method as claimed in claim 3, wherein
the weighted sum value of the random access preamble group B power offset value and the power offset value between the random access preamble and the Msg3 is: a sum value of the random access preamble group B power offset value and the power offset value between the random access preamble and the Msg3.

15. The method as claimed in claim 4, wherein
the weighted sum value of the random access preamble group B power offset value and the power offset value between the random access preamble and the Msg3 is: a sum value of the random access preamble group B power offset value and the power offset value between the random access preamble and the Msg3.

16. The method as claimed in claim 3, wherein
the network side performs a long time statistics on the cell and calculates the number of resources $\lambda_{need}$ required to be allocated to the Msg3 per second on average and the number of resources $\lambda_{actual}$ actually allocated to the Msg3 per second on average, and when $\lambda_{need}<\lambda_{actual}$, the network side judges that the number of resource blocks which can be allocated to the Msg3 in the current cell is sufficient, and when $\lambda_{need}>\lambda_{actual}$, the network side judges that the number of resource blocks which can be allocated to Msg3 in the current cell is insufficient.

17. The method as claimed in claim 4, wherein
the network side performs a long time statistics on the cell and calculates the number of resources $\lambda_{need}$ required to be allocated to the Msg3 per second on average and the number of resources $\lambda_{actual}$ actually allocated to the Msg3 per second on average, and when $\lambda_{need}<\lambda_{actual}$, the network side judges that the number of resource blocks which can be allocated to the Msg3 in the current cell is sufficient, and when $\lambda_{need}>\lambda_{actual}$, the network side judges that the number of resource blocks which can be allocated to Msg3 in the current cell is insufficient.

18. The method as claimed in claim 3, wherein
the network side performs a long time statistics on the cell and calculates the number of resources $\lambda_{need}$ required to be allocated to Msg3 per second on average, the number of resources $\lambda_{actual}$ actually allocated to Msg3 per second on average and the number of UEs $N_{UE}$ initiating a random access per second on average; and
when $$\frac{\lambda_{actual} - \lambda_{need}}{N_{UE}} \geq 1 RB,$$

the network side judges that the number of resource blocks which can be allocated to the Msg3 in the current cell is sufficient, and when $$\frac{\lambda_{need} - \lambda_{actual}}{N_{UE}} \geq 1 RB,$$

the network judges that the number of resource blocks which can be allocated to the Msg3 in the current cell is insufficient.

19. The method as claimed in claim 4, wherein
the network side performs a long time statistics on the cell and calculates the number of resources $\lambda_{need}$ required to be allocated to Msg3 per second on average, the number of resources $\lambda_{actual}$ actually allocated to Msg3 per second on average and the number of UEs $N_{UE}$ initiating a random access per second on average; and
when $$\frac{\lambda_{actual} - \lambda_{need}}{N_{UE}} \geq 1 RB,$$

the network side judges that the number of resource blocks which can be allocated to the Msg3 in the current cell is sufficient, and when $$\frac{\lambda_{need} - \lambda_{actual}}{N_{UE}} \geq 1 RB,$$

the network judges that the number of resource blocks which can be allocated to the Msg3 in the current cell is insufficient.

* * * * *